United States Patent
Masters et al.

(10) Patent No.: US 12,292,545 B2
(45) Date of Patent: *May 6, 2025

(54) IN SITU MEASUREMENT STATION FOR MONITORING WIND AND WATER PROPERTIES IN EXTREME HYDRODYNAMIC CONDITIONS

(71) Applicants: University of Florida Research Foundation, Inc., Gainesville, FL (US); Clarkson University, Potsdam, NY (US); Woods Hole Oceanographic Institution, Woods Hole, MA (US)

(72) Inventors: Forrest J. Masters, Gainesville, FL (US); Pedro L. Fernandez-Caban, Potsdam, NY (US); Brian M. Phillips, Gainesville, FL (US); Christopher C. Ferraro, Gainesville, FL (US); Britt Raubenheimer, Woods Hole, MA (US); Wei-Ting Lu, Gainesville, FL (US); Joseph Alex Esposito, Shalimar, FL (US)

(73) Assignees: University of Florida Research Foundation, Inc., Gainesville, FL (US); Clarkson University, Potsdam, NY (US); Woods Hole Oceanographic Institution, Woods Hole, MA (US)

( * ) Notice: Subject to any disclaimer, the term of this patent is extended or adjusted under 35 U.S.C. 154(b) by 519 days.

This patent is subject to a terminal disclaimer.

(21) Appl. No.: 17/327,148

(22) Filed: May 21, 2021

(65) Prior Publication Data
US 2022/0155484 A1    May 19, 2022

Related U.S. Application Data

(60) Provisional application No. 63/113,478, filed on Nov. 13, 2020.

(51) Int. Cl.
*G01W 1/04* (2006.01)
*E04H 12/18* (2006.01)
(Continued)

(52) U.S. Cl.
CPC .............. *G01W 1/04* (2013.01); *E04H 12/18* (2013.01); *G01W 1/10* (2013.01); *G06N 5/04* (2013.01);
(Continued)

(58) Field of Classification Search
CPC .......... G01W 1/02; G01W 1/04; E04H 12/18
See application file for complete search history.

(56) References Cited

U.S. PATENT DOCUMENTS 2,733,030 A * 1/1956 Hawthorne .......... H01Q 1/1221
248/314
2,977,402 A * 3/1961 Parkison ................. E04H 12/18
174/45 R
(Continued)

FOREIGN PATENT DOCUMENTS

CN     111381293 A  *  7/2020
DE     3703804 A1   *  8/1967
(Continued)

*Primary Examiner* — Jill E Culler
(74) *Attorney, Agent, or Firm* — Thomas | Horstemeyer, LLP

(57) ABSTRACT

The present disclosure describes various embodiments of systems, apparatuses, and methods of monitoring wind and water properties. For one such weather monitoring system, a weather monitoring station comprises an upper mast section having an instrumentation package, wherein the instrumentation package includes an orientation sensor, communications circuitry, a wind velocity sensor, and a control unit that is configured to at least receive sensor data and transmit communication data via the communications circuitry. The weather monitoring station further includes at least one lower mast section that is coupled to the upper mast (Continued)

section, and an anchoring system that is coupled to the lower mast section, wherein the anchoring system includes at least one subsurface anchor for inserting into a ground surface within a littoral zone of a coastal area. Other systems, apparatuses, and methods are also provided.

19 Claims, 10 Drawing Sheets

(51) Int. Cl.

| | |
|---|---|
| *G01W 1/00* | (2006.01) |
| *G01W 1/10* | (2006.01) |
| *G06N 5/04* | (2023.01) |
| *G06N 20/00* | (2019.01) |
| *H04L 67/12* | (2022.01) |
| *E02D 5/56* | (2006.01) |
| *E02D 27/16* | (2006.01) |
| *H04N 7/18* | (2006.01) |
| *H04Q 9/00* | (2006.01) |

(52) U.S. Cl.
CPC ............. *G06N 20/00* (2019.01); *H04L 67/12* (2013.01); *E02D 5/56* (2013.01); *E02D 27/16* (2013.01); *G01W 2001/006* (2013.01); *H04N 7/183* (2013.01); *H04Q 9/00* (2013.01); *H04Q 2209/40* (2013.01)

(56) References Cited

U.S. PATENT DOCUMENTS

| | | | | |
|---|---|---|---|---|
| 6,705,773 | B2 * | 3/2004 | Fix | F16M 11/2064 |
| | | | | 396/419 |
| 9,309,686 | B2 * | 4/2016 | Gorney | E04H 12/345 |
| 9,784,887 | B1 * | 10/2017 | Ulmer | B64D 1/08 |
| 9,851,179 | B2 * | 12/2017 | Volfson | G01W 1/02 |
| 11,579,335 | B2 * | 2/2023 | Masters | G06N 5/04 |

FOREIGN PATENT DOCUMENTS

| | | | | |
|---|---|---|---|---|
| DE | 29911852 U1 | * | 12/1999 | ........... E04H 12/187 |
| GB | 759483 A | * | 10/1956 | |
| GB | 2481418 A | * | 12/2011 | ............. F03D 13/20 |
| KR | 20140005112 U | * | 9/2014 | |

\* cited by examiner

IN SITU MEASUREMENT STATION FOR MONITORING WIND AND WATER PROPERTIES IN EXTREME HYDRODYNAMIC CONDITIONS

CROSS-REFERENCE TO RELATED APPLICATION

This application claims priority to co-pending U.S. provisional application entitled, "In Situ Measurement Station for Monitoring Wind and Water Properties in Extreme Hydrodynamic Conditions," having Ser. No. 63/113,478, filed Nov. 13, 2020, which is entirely incorporated herein by reference.

BACKGROUND

Storm surge severely limits monitoring of wind and water conditions at the coast. Fixed weather stations fail to report weather data because of flooding, wind- and water-borne debris, power loss, lack of adequate backup power, or loss of communications. The absence of critical missing data diminishes the situational awareness of emergency managers, meteorologists, engineers, and other professions that monitor extreme weather and leads to large variations between the maximum observed offshore winds and available "ground truth" weather data at onshore locations.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
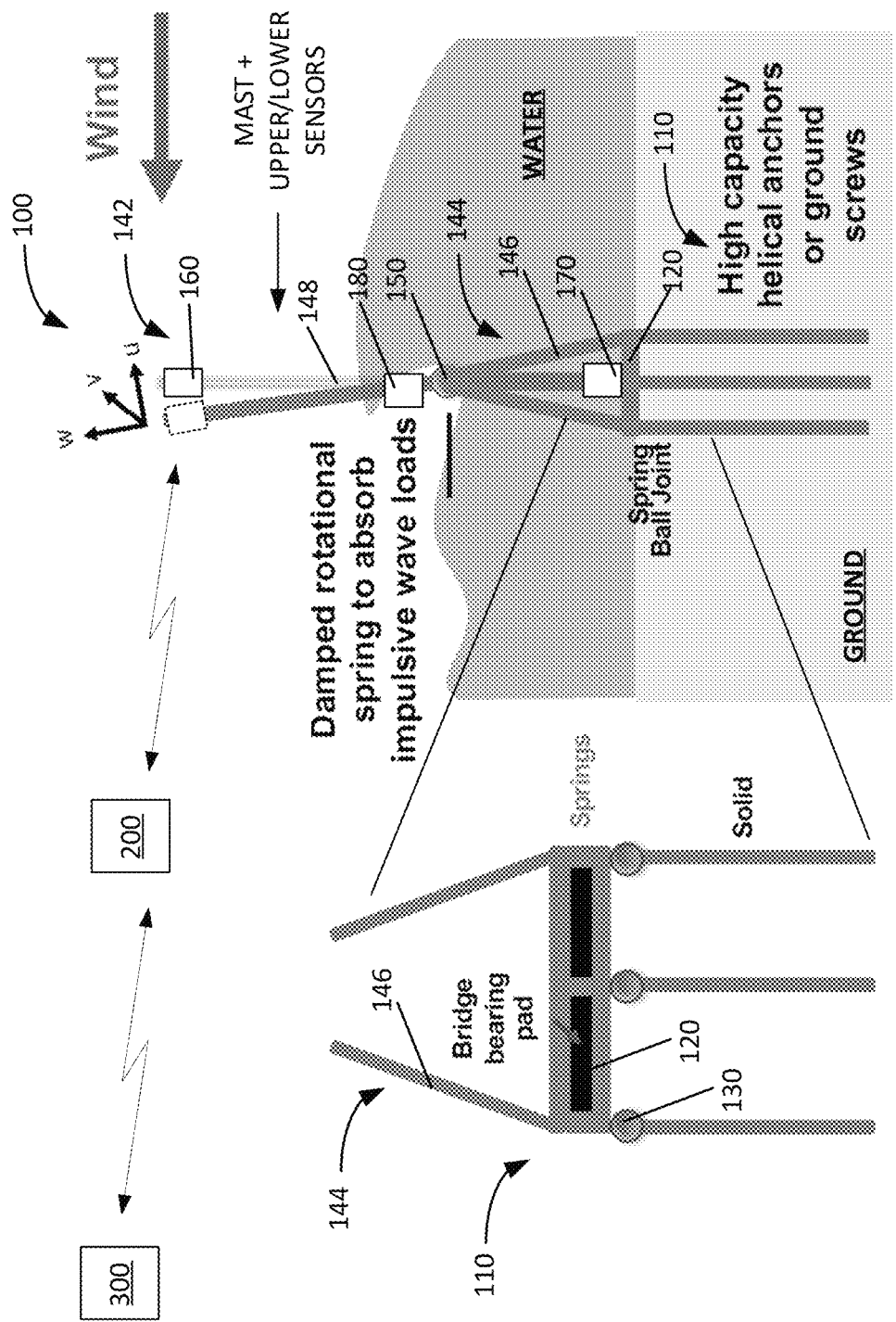
FIGS. 1A-1F show various views of an exemplary embodiment of a monitoring station and related components in accordance with the present disclosure.

The present disclosure describes various embodiments of systems, apparatuses, and methods of monitoring wind and water properties via an onshore measurement station.

In accordance with embodiments of the present disclosure, an exemplary monitoring system (also referred to as a Sentinel monitoring station) is placed where storm surge is expected to occur (e.g., a shoreline), either permanently or temporarily. In some embodiments, its structural system is compliant (flexible) to attenuate an applied storm surge and wave forces, thereby reducing the size and weight of the structural system and the forces that act on it. In other embodiments, the structural system may be rigid. Incorporation of high-strength composite materials, passive shock absorption, and ground anchoring ensures that the structural integrity of an exemplary monitoring system remains intact in storm conditions up to a Saffir Simpson Hurricane Wind Scale Category 5 Hurricane. Further, an exemplary monitoring system incorporates a novel orthogonalization system (having an orientation sensor and processor within an embedded instrumentation package 160 (FIG. 1A)) to reorient the reference frame of an anemometry sensor on a flexible part of structure to the earth surface's coordinate system as the orthogonalization system deflects (e.g., 20-25 degrees, 1-90 degrees, etc.) under a breaking wave load. Using real-time measurements of the water depth, the monitoring station is configured to estimate the wind velocity standardized to the World Meteorological Organization height of 10 meters by applying a wind velocity conversion that accounts for the apparent change in instrument height caused by the rise in storm surge, in various embodiments.

In general, extreme wind or hydrodynamic events (e.g., tropical cyclones, nor'easters, etc.) cause storm surge and waves that restrict or deny the observation of wind, hydrodynamic, erosion, and water quality conditions at the coast. Flooding, wind/current/wave action, erosion, wind/waterborne debris, and power loss cause widespread interruption to conventional measurement or monitoring stations exactly at the time when their data are needed most by operational and research interests. The few stations that continue to operate generally only measure wind or hydrodynamic conditions, but not both. Thus, conventional monitoring stations do not simultaneously measure key variables that define the impact to a coastal community, e.g., wind velocity, water depth, wave height and direction, erosion, and biological/chemical properties associated with environmental and ecological degradation (e.g., pollutants from a petrochemical spill, animal waste, etc.).

Exemplary monitoring stations of the present disclosure overcome these problems by introducing a new class of measurement station that will operate in situ at the coast while being impacted by extreme flood currents and shoaling waves. In contrast to current systems that are elevated/hardened to avoid/resist these conditions, an exemplary monitoring station is structurally compliant (flexible) to attenuate the applied storm surge and wave forces and ultimately reduce the size and weight of the structural system. By deploying multiple monitoring stations in an array along a coastline prior to an incoming hurricane reaching landfall, measured data can be ingested into data schemes for numerical weather prediction tools and surface wind field analyses to predict the overland wind velocity in the landfall region. Such observations will support validation and verification of satellite-, aircraft-, and ground-based remote sensing tools.

While systems exist for flexible masts for dry land applications, such as antennas or wind turbine applications, these types of structures have not been utilized for a weather station operating in the surf zone. Additionally, aircraft, satellite, and buoy-based measurements (for conditions obtained away from an onshore location) do not sufficiently fill the observational gap (from the critical missing data at onshore locations). For example, regarding aircraft measurements, the operation of a stepped-frequency microwave radiometer (SFMR) on a WP-3D aircraft requires 30 meters of water depth to avoid shoaling waves that contaminate brightness measurements. Thus, aircraft measurement operations are not available at nearshore and onshore locations. For satellite measurements, scatterometers experience the same issue and as a result, satellite-derived wind velocity estimates are generally done far offshore. Likewise, buoys are sparse and also located too far offshore. Thus, critical missing data at nearshore and onshore locations leads to large variations between the maximum observed offshore winds and available "ground truth," such that data are usually 1-2 Saffir Simpson Hurricane Wind Scale (SSHWS) categories apart, even after standardizing for terrain roughness and topography, and onshore surface wind maxima are rarely sampled. A few kilometers difference in the location of a weather station can mean capturing data at a radius of maximum wind (RMW) or not. In general, surface observations are often not available in and near the eyewall of an approaching hurricane. Thus, these observations may be below both the operational and final best track intensities of the hurricane, and the observing sites may likely not be optimally located to sample the maximum winds, which is typical during landfalling hurricanes. In summary, current surface-based measurement technologies operate on land (e.g., an airport weather station), in deep water (e.g., buoy, ship), or attached to an existing structure (e.g., water level monitoring station mounted to a pier), leading to a critical observational gap.

Correspondingly, the present disclosure provides solutions for such issues. For example, an exemplary monitoring station in accordance with the present disclosure can be deployed at the pre-storm shoreline where the worst storm conditions are expected to occur. Therefore, in accordance with embodiments of the present disclosure, (1) the surface wind and water data (e.g., water depth, pressure, air/water temperature, and salinity) at the shoreline during tropical cyclone landfalls can be measured using conventional technology; (2) latency in monitoring the arrival, progression, and subsiding of the strongest winds and storm surge can be reduced or eliminated; (3) a critical knowledge gap regarding the behavior and structure of surface winds in the littoral zone can be filled; (4) surface velocity estimates originating from reconnaissance aircraft, ground level doppler radars, and satellite-based remote sensing can be improved; (5) data can be assimilated into (physics-based) landfall nowcasts and hindcasts to produce high accuracy wind swaths during the storm's approach and passage; and (6) data and modeling can be made available to an external or remote computer system 300 (FIG. 1A) by live streaming all products to operational, commercial, and research interests.

Figure 1B:
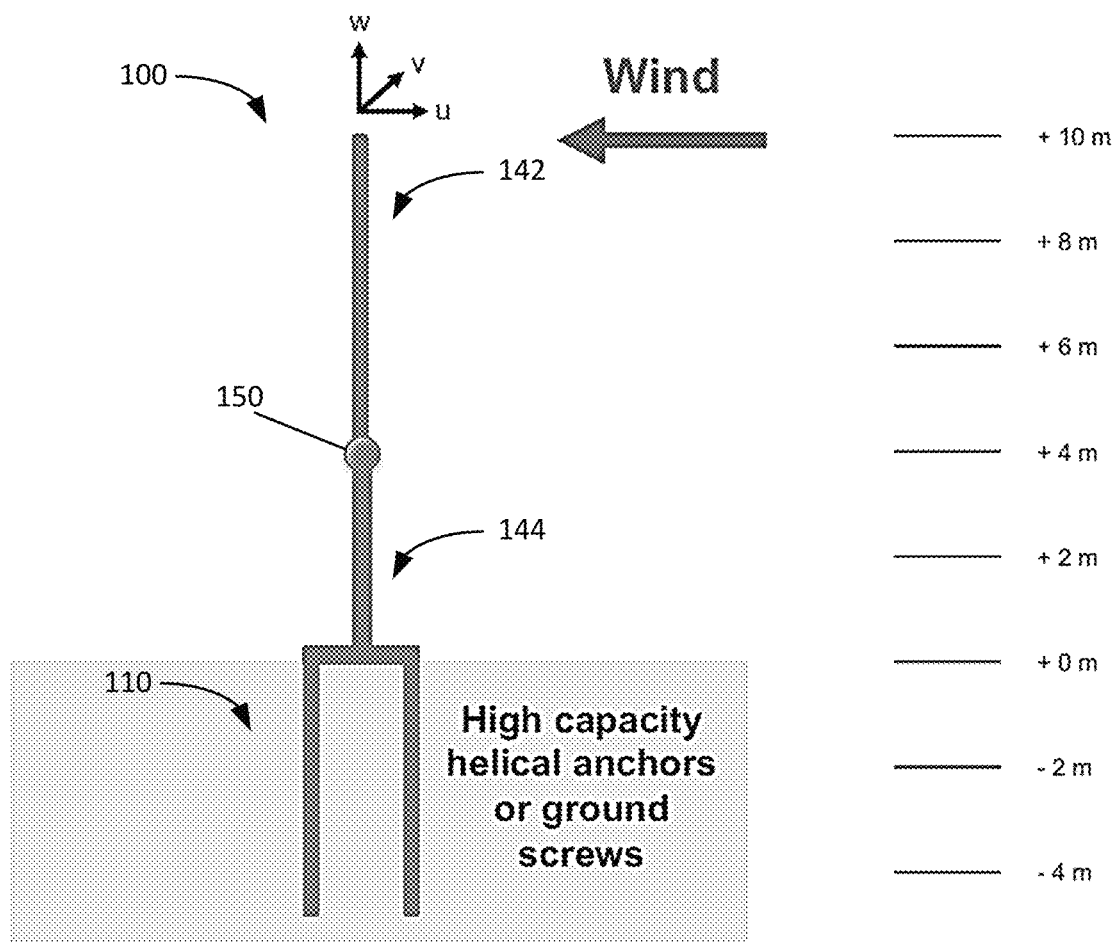
Figure 1C:
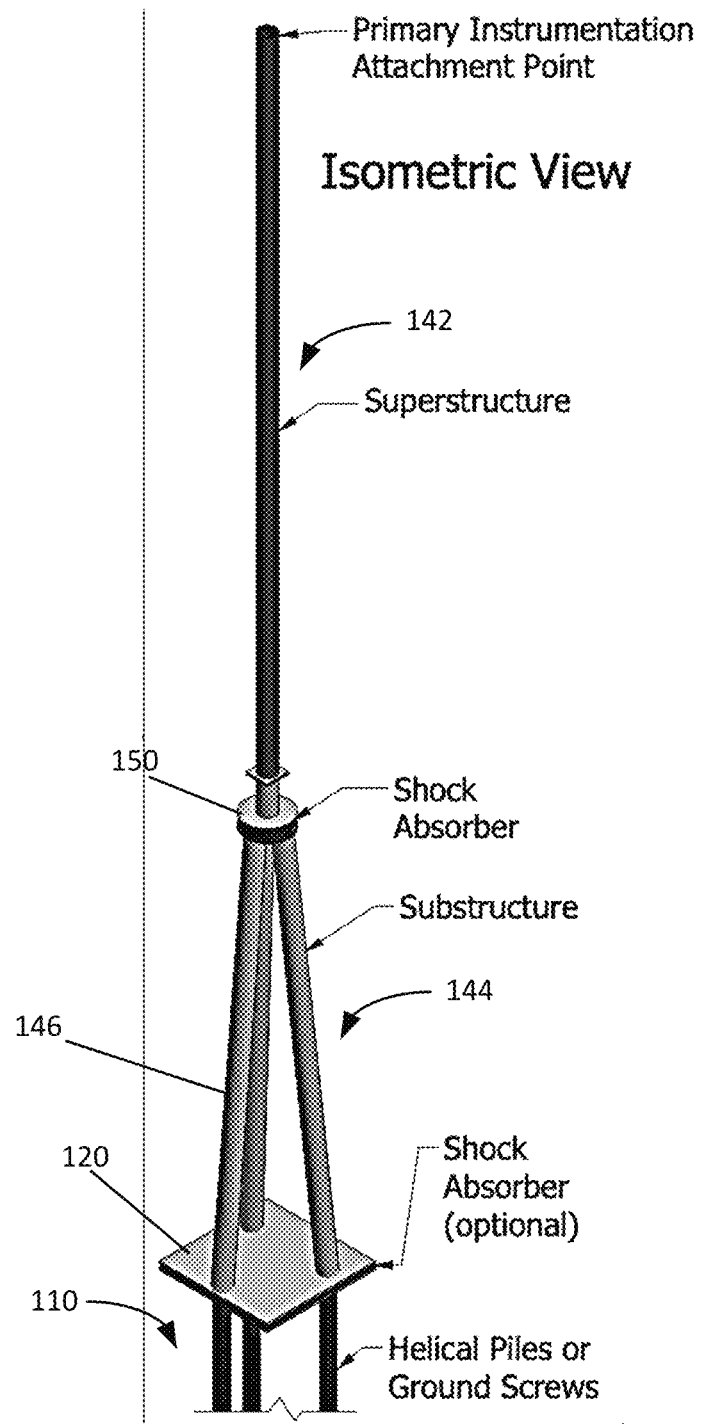
Figure 1D:
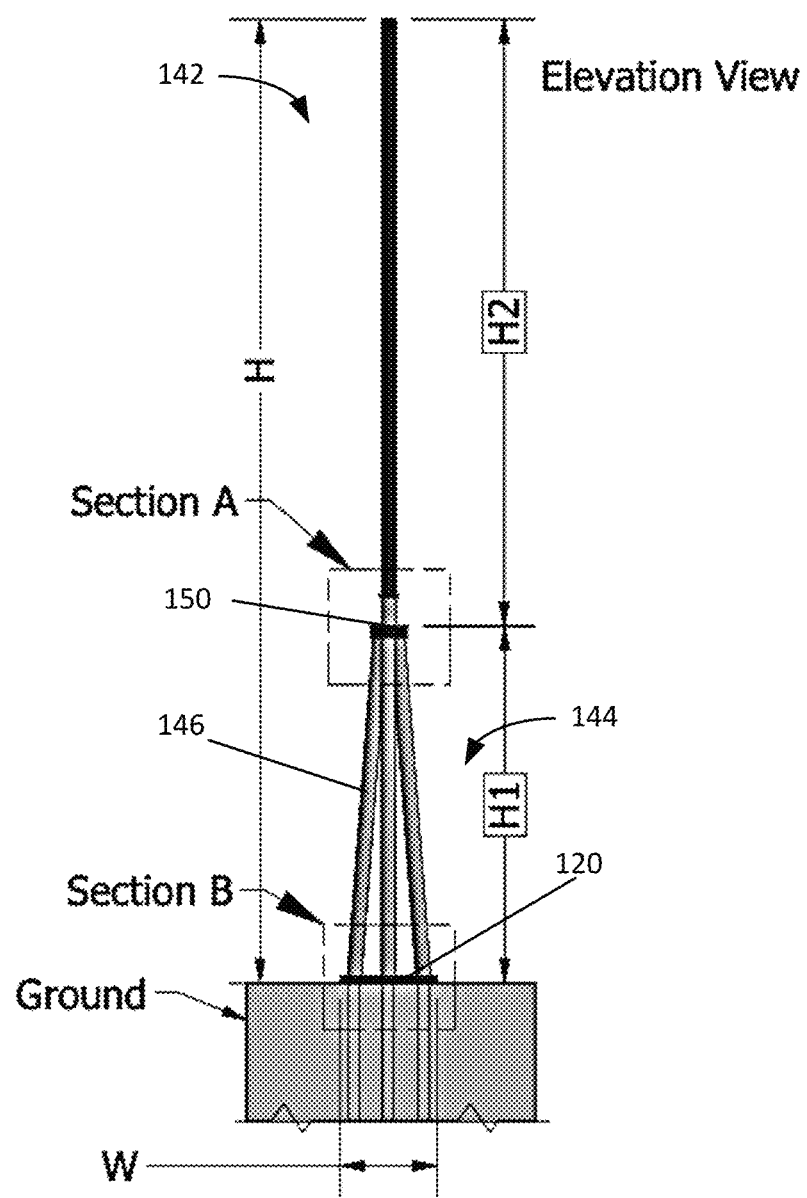
Figure 1E:
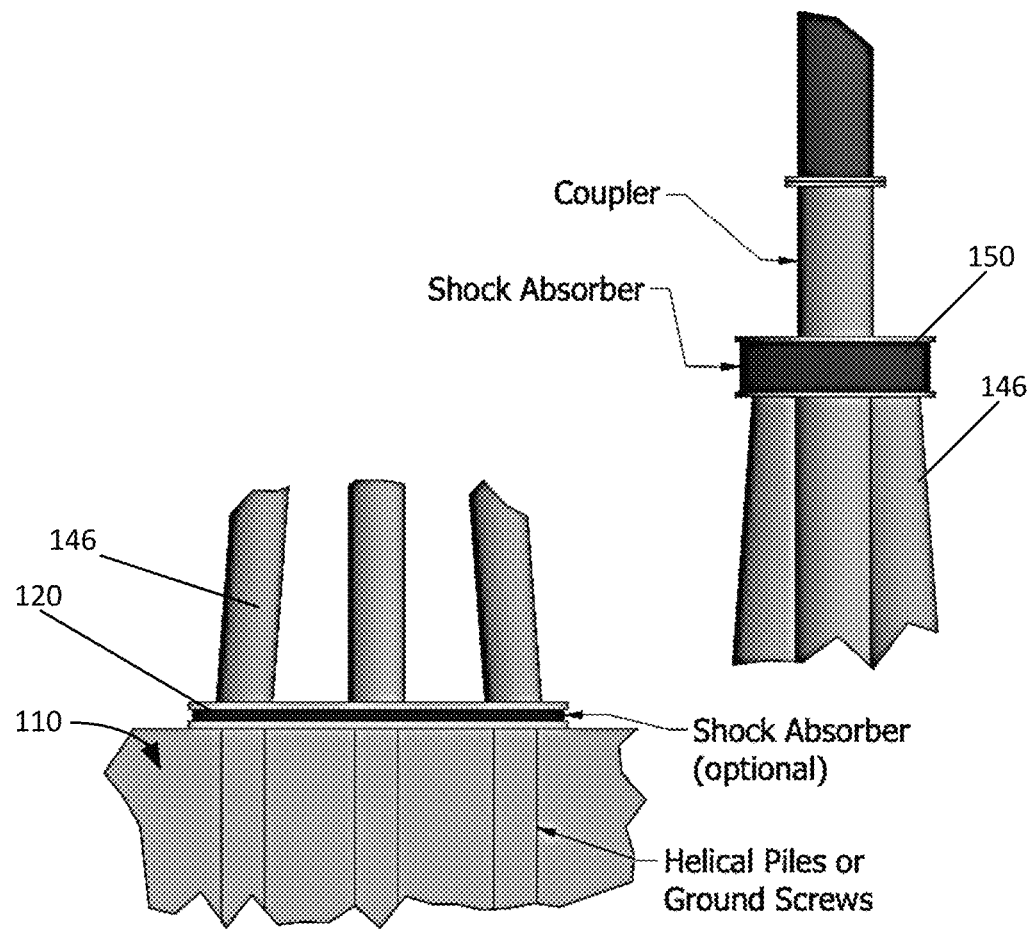
Figure 1F:
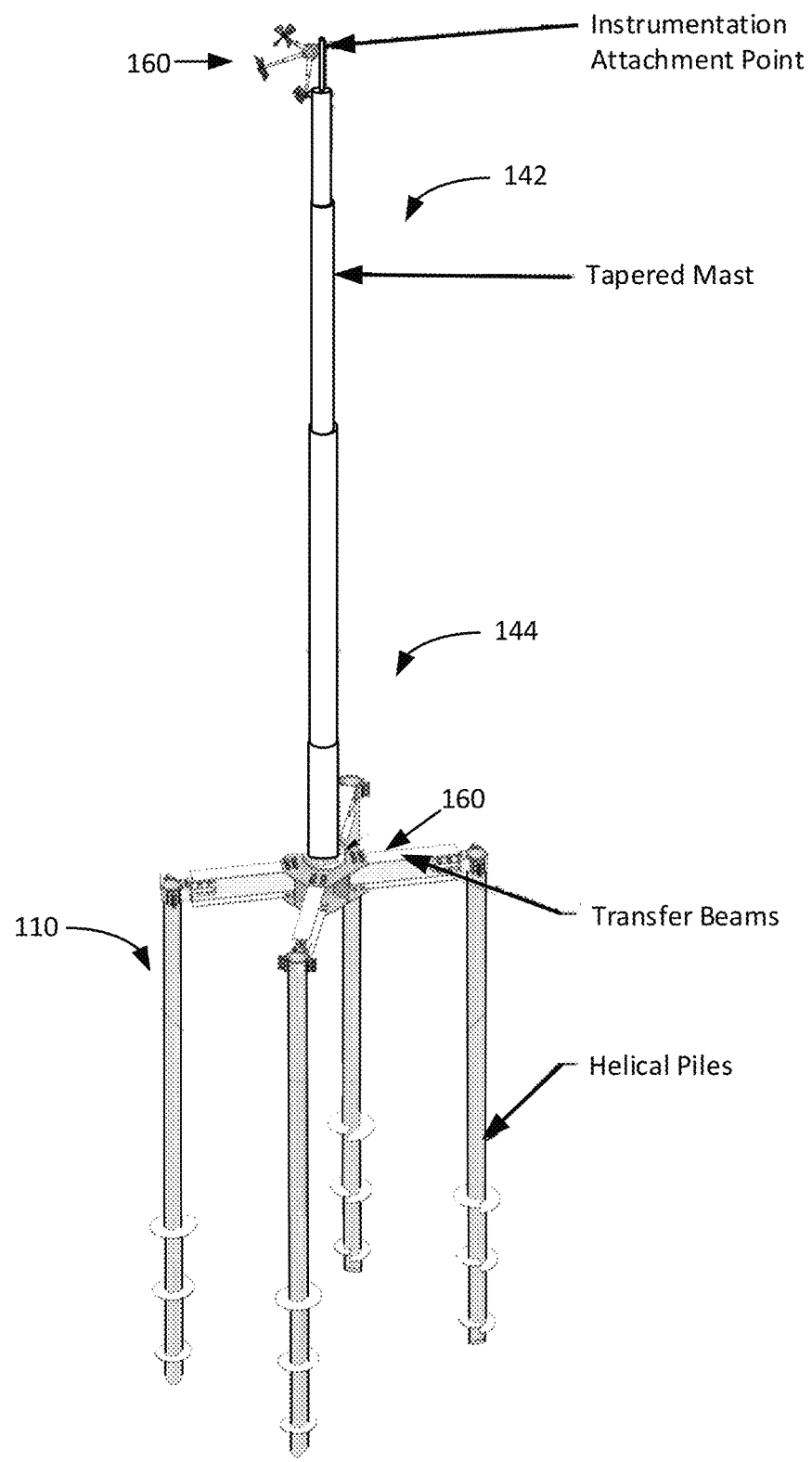

FIGS. 1A-1F show various views of an exemplary embodiment of a monitoring station 100 and related components in accordance with the present disclosure. The monitoring station 100 features a compact anchoring system 110 utilizing subsurface anchoring systems (e.g. helical anchors/piles or ground screws). Based on the particular weather and soil conditions, the number of individual anchors secured to the ground is adjustable. For example, FIG. 1B shows two subsurface anchors being deployed in a dry environment, whereas FIG. 1A shows three subsurface anchors and FIG. 1F shows four subsurface anchors being deployed in a wet or stormy environment. Also, FIGS. 1A and 1C-1E shows two or more support bars 146 extending from a bridge bearing pad 120 to the junction at a damped rotational spring 150, thereby providing support to a lower mast assembly 144, whereas FIG. 1B does not utilize the additional support structures (between the bridge bearing pad 120 and the rotational spring 150). Further, FIG. 1F shows transfer beams 125 in place of the bridge bearing pad 120 at the junction of the lower mast assembly 144 and the helical anchors or piles, in accordance with various embodiments of the present disclosure. In various embodiments, anchoring piles can be separated into four pieces that are assembled during installation, in which an exemplary subsurface anchoring system of the present disclosure is capable of fully transferring internal forces (axial, shear, bending moment, torsion) across the connections. In contrast, conventional piles are typically designed to transfer axial and torsional forces only; thus, the connections are weak in shear and moment transfer.

Additionally, in various embodiments, joints 130 at a junction of the anchors 110 with a bridge bearing pad 120 of the monitoring station structure 100 and the pad 120 itself can optionally incorporate a shock absorber, as shown in FIGS. 1C and 1E, to help absorb the impact from wind or water forces. In various embodiments, a damped rotational spring 150 is applied at a junction between the upper mast 142 and the lower mast 144 of the monitoring station assembly 100 which allows for the upper mast 142 to deflect or tilt in response to wind or water forces. The benefits of relaxing a lateral drift constraint of the upper mast 142 (by not requiring it to be in a fixed position) include that (a) the uplift force on the subsurface anchoring system is reduced, (b) the required rigidity and thus the required cross section of the upper mast 142 is reduced, and (c) the rotational spring 150 acts to better absorb impacts from the wind and water forces and wind/water borne debris. Further, in various embodiments, the mast is tapered such that the upper mast 142 is smaller in size or diameter than the lower mast 144, and as a result the mast is structurally stronger or more stiff at a bottom of the mast than the top, which aids in withstanding impacts from the wind and water forces.

In general, subsurface anchoring systems, such as helical anchors and ground screw anchors, are excellent options to withstand extreme surge, wave, and wind loads. Axial tension/compression for such anchoring structures can exceed 50,000 kg (~100 kips), while being relatively inexpensive (<$500), temporary, and reusable. Due to their compact form factor (helices <30 cm), they are easy to transport and are lightweight (e.g. a large lead screw ~75 kg (165 lb)). They allow for quick installation (~60 min typically) and are extendible in sections to ~6 m (20 ft), well below erosion depth. Further, a ground penetrating radar can be used to identify underground obstructions, while helical anchors, in particular, can minimize soil disturbance. As such, the exemplary monitoring stations are designed for quick assembly, disassembly, and reusability.

One key design feature for embodiments of the present disclosure is that the design of the monitoring station 100 is environmentally friendly. For example, in various embodiments, the temporary anchoring system 110 is compact (shafts are a few inches wide) and operated slowly (8-10 RPM) to prevent soil disturbance. Therefore, the beach will remain the same subsequent to the removal of the monitoring station 100 and its anchoring structures. The design of the monitoring station 100 is also visually unobtrusive, due to the structural system being slender, mainly consisting of a single pole supporting light instrumentation package 160 at an upper section of a mast assembly, an optional instrumentation package 170 at a lower section of the mast assembly, an optional instrumentation package 180 at a middle section of the mast assembly, and imperceptible to the human eye from 500-1000 feet. In general, placement of a data acquisition system, such as one or more instrumentation packages, can be located at varying points along the mast assembly. In accordance with embodiments of the present disclosure, an exemplary system is configured to real-time transmit key variables associated with wind, storm surge, waves, and erosion and be configurable to measure water quality. In accordance with various embodiments, the mast assembly can be assembled or disassembled in sections in which sections to be coupled are designed to mate with one another and/or be secured using various fasteners, such as screws, bolts, etc.

As discussed, an orientation sensor is integrated within the instrumentation package 160 at a top of the upper mast 142 to detect and measure an alignment or tilt of the upper mast. A height of the upper mast 142 is, but not limited to only being, 10 meters above the ground level, in various embodiments. Thus, as the upper mast 142 moves or deflects in response to water or wind forces, sensor data can be adjusted to account for the orientation of the upper mast 142 to which respective sensors are positioned (as part of instrumentation package 160), such as wind sensors, water level sensors, etc. As an example, FIG. 1F shows an anemometer wind sensor positioned at a top of the upper mast of an exemplary monitoring station. Thus, a processor or control unit within the instrumentation package 160 (e.g., coupled to the upper mast 142 or other location) can configure a reference axis for the upper mast from the orientation sensor feedback and make real-time wind field standardization to the acquired sensor data by: measuring a distance from observation height (z) to the water surface; calculate a moving average of $z_{actual}$, to estimate the "modified" height above ground; and perform a wind field standardization to get real-time wind velocity estimates at the World Meteorological Organization (WMO) observation height of 10 meters. In various embodiments, as part of the instrumentation package 160, the control unit is coupled to a video camera attached to an upper mast 142 and various sensor devices attached to the upper mast 142 and lower mast 144 of the monitoring station 100. Further, the control unit is coupled to communications equipment (within the instrumentation package 160) that is configured to transmit the acquired sensor data to a network base station or data server 200 to which the data can be stored and/or relayed to other communication stations or remote computing systems 300. For example, in various embodiments, variables or parameters associated with wind, storm surge, waves, erosion, and water quality are transmitted in real time to interested parties.

Figure 2:
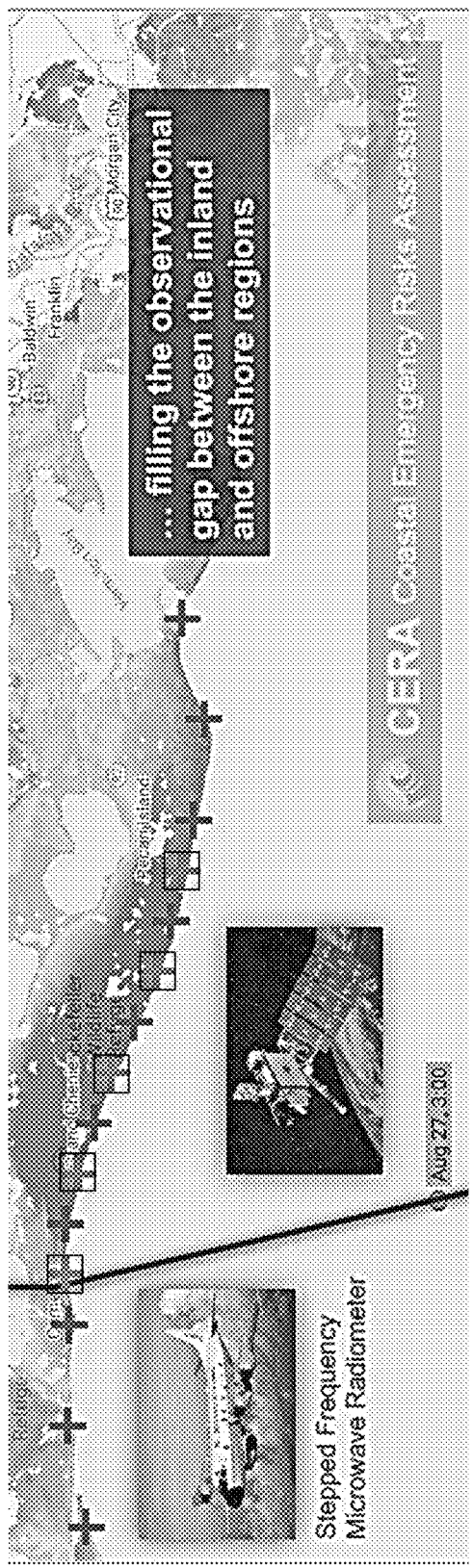
FIG. 2 shows an arrangement of exemplary monitoring stations in an array pattern along a coastline in accordance with various embodiments of the present disclosure.

In accordance with various embodiments, multiple exemplary monitoring stations can be deployed rapidly at a shoreline in a dense array from the track to 2*RMW of an approaching storm or hurricane related event in order to fill the observational gap between the inland and offshore regions. In one embodiment, the individual monitoring stations can be deployed at 10-15 km intervals along the coast at 24-48 hours before landfall (unbounded cross markers), with gaps being filled in the 12-24 hour interval before landfall to optimally sample from the track to 2*RMW (bounded cross markers), demonstrated by FIG. 2.

In various implementations, multiple monitoring stations 100 can be deployed along the shoreline outward from the expected center of the storm track to resolve the structure and intensity of the storm and its impact to the entire affected coastline. Stations 100 can be advantageously moved to desirable positions on the open shoreline in a pattern optimized to strategically observe a single extreme wind event, e.g., an adaptive network. Fixed stations do not have this capability. Communications by and between the respective monitoring stations 100 can be performed by setting up a network using ultra long range Wi-Fi or other communications technology to enable robust communications. Post-event, the available communications may also be offered as free Wi-Fi to affected communities in the nearby area. Acquired sensor data from the monitoring stations 100 within the array can be transmitted to a central or base station (or server) 200 and/or transmitted to multiple remote stations using the communication network such that the sensor data may be aggregated and made available for analysis within a cloud networking environment. Such analysis will allow for inferences to be made about the storm structure, e.g., Holland B parameter, radius to maximum winds, etc. Accordingly, the collected data can be used to inform data schemes for numerical weather prediction tools/models and surface wind field analyses and/or validate and verify satellite-, aircraft-, and ground-based remote sensing estimates.

Key features for such stations 100 include that the station (a) is resistant to combined water current, wave, and wind loads expected to occur near or at the shore; (b) is configured to obtain high fidelity measurements of wind velocity, water depth and wave direction, erosion, pressure, air/water temperature, salinity, and water quality; (c) is equipped with a video feed that may be augmented with superimposed analytics (e.g., wind velocity, pressure data, etc.) in real-time; (d) is easily stowable of 12-15 units on a single trailer that meets Department of Transportation (DOT) roadway requirements; (e) features a minimalist design, e.g., uses simple structural elements and passive controls (e.g., passive shock absorption), and (f) adopts an Internet-of-Things (IoT) approach for data collection and real-time communications (compact, low power, 5G, real-time processing using an embedded system). Minimal costs (<$50K) for such stations ensure that losing 1-2 per major hurricane could be reasonably absorbed within a typical annual operations and maintenance budget.

Figure 3:
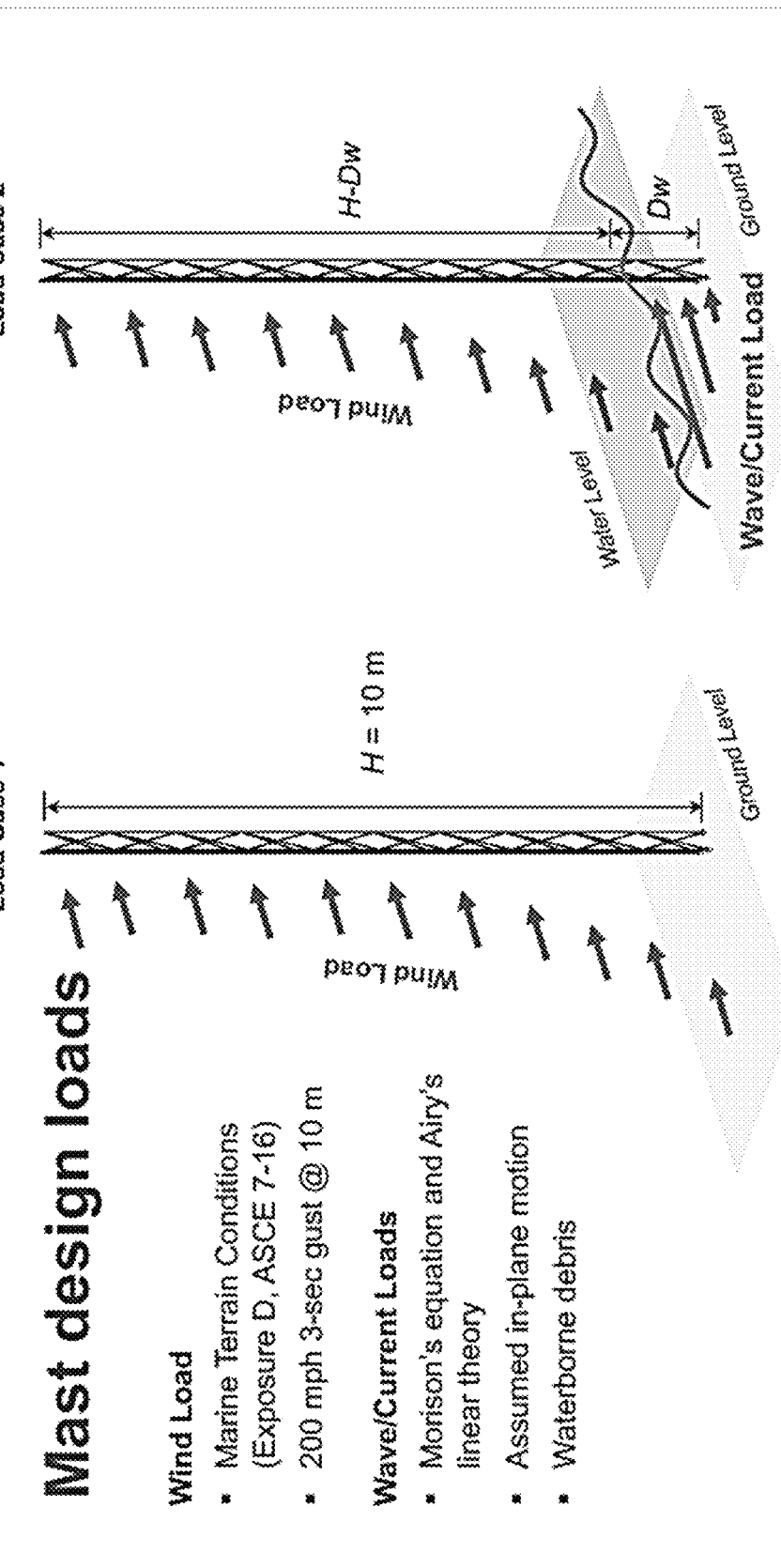
FIGS. 3-4 illustrate structural design considerations for a mast assembly of exemplary embodiments of the monitoring station in accordance with the present disclosure.
Figure 4:
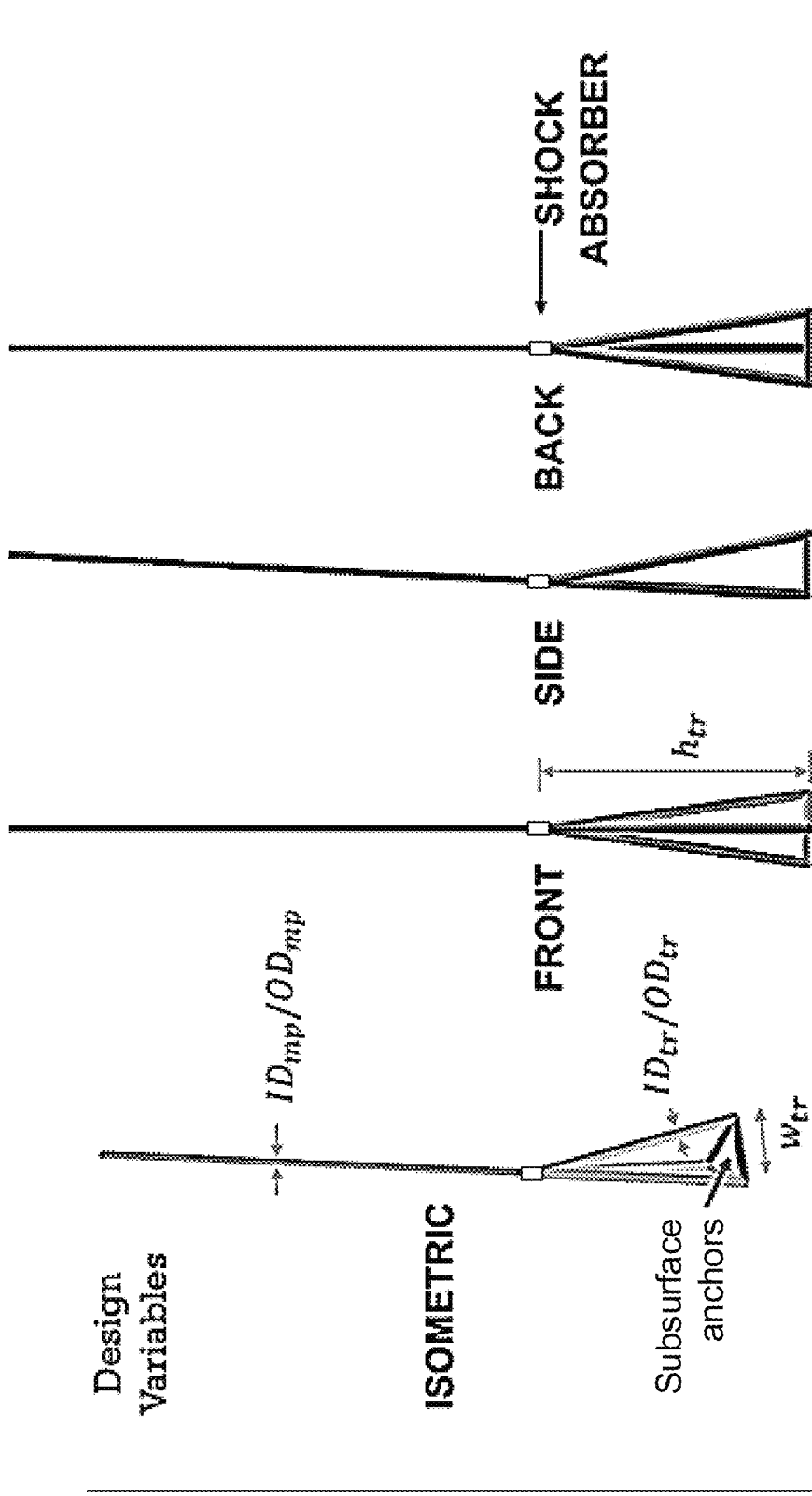

For a hurricane, conditions experienced by the individual monitoring station 100 will vary based on the station's relative location to the eyewall of the hurricane. High wind and storm surge occur along the track of the storm, whereas a front right quadrant of the storm produces the highest winds and storm surge and the weak side of the storm produces onshore winds and "reverse" storm surge. Accordingly, the mast structure 148 of an exemplary monitoring station 100 is designed to withstand 200 mph wind with 3-second gusts at a height of 10 meters from wind forces, in various embodiments, while also being designed to hold up to wave and current loads from water forces during storms. Additionally, design optimization techniques are applied to models of the monitoring station to test and optimize the geometry and member sizing of the system to minimize structural mass while satisfying multiple structural design constraints (e.g., strength, frequency, and deflection requirements). In various embodiments, the structure 148 of upper and/or lower mast assembly is formed of multiple structural members. FIGS. 3-4 illustrate structural design considerations for a mast assembly of exemplary embodiments of the monitoring station in accordance with the present disclosure. Accordingly, the mast assembly should be designed to withstand various cases or combinations of wind, wave, and current loads that may be encountered during storm activities. While the structure 148 of the upper mast assembly is depicted as being a cylindrical pole in certain basic figures, it is noted that the mast assembly has a triangle cross-section orientation defined by the three rods, in various embodiments of the present disclosure. Other shapes and configurations are also contemplated in other embodiments. For example, the mast can have an airfoil shape that can rotate or deform to reduce the drag coefficient in one embodiment. Additionally, in one embodiment, among others, the mast assembly features a monopole on top of a triangular truss.

As discussed, upper, lower, and/or middle instrumentation packages 160, 170, 180 are embedded in the monitoring station assembly 100. In various embodiments, the instrumentation packages 160, 170, 180 are configured to be compact, operate on low power, incorporate low cost sensors, and/or be equipped with communication circuitry that is able to remain connected to a 5G network throughout the storm passage. In various embodiments, the communication circuitry is also able to be connected to neighboring monitoring stations within an array. Such an embedded system is configured to perform calculations on the data measured by the station sensors, e.g. orthogonalization, roughness length, displacement height, and drag coefficient estimation, standardization, wave period, significant wave height, etc. In various embodiments, raw sensor data from each of the stations 100 in the dense array can be automatically streamed to a remote base or central station 200 or other network device for combined postprocessing (e.g., position estimates, eye detection, wind radii data. RMW, Holland B parameter), visualization, and distribution to operational and research channels. Power for the instrumentation packages is provided from battery modules or packs that are embedded within the monitoring station 100.

Sensors deployed on the monitoring station 100 may be located in an upper mast sensor instrumentation package 160, a lower mast sensor instrumentation package 170, a middle mast sensor instrumentation package 180 and/or anywhere between those locations. As an non-limiting example, the upper mast sensor instrumentation package 160 may include sensors of the following types: an anemometer, a GPS/GNSS, barometric pressure, air temperature, water column height, magnetometer/compass, tilt/orientation/acceleration, and a video feed, among others. As a non-limiting example, the lower or middle mast sensor instrumentation packages 170, 180 may include sensors of the following types: water temperature, salinity, water depth, wave direction, water quality, and erosion (for shoreline protection), among others. The lower and/or middle instrumentation packages are interconnected with the upper instrumentation package and the control unit and communication circuitry contained within.

In general, any particular instrumentation at any particular location on the monitoring station can measure or acquire a variety of sensor data that can include, but is not limited to only including, 3D air velocity (from which speed and direction and be derived), barometric pressure, air temperature, water temperature, water depth at sufficient temporal resolution to characterize waves, wave direction, erosion, water quality, etc.

The addition of onshore meteorological data during hurricane events can enable partnerships with a variety of weather-related agencies and industries. For example, live (zero latency) reporting of high-fidelity data can be used to monitor decaying weather conditions and be made available to National Oceanic and Atmospheric Administration (NOAA) (e.g., National Hurricane Center (NHC), Weather Forecast Office (WFO), Hurricane Research Division (HRD), Office of Science and Technology Integration (STI)), (Federal Emergency Management Agency (FEMA) (e.g. Mitigation Assessment Team (MAT)), National Institute of Standards and Technology (NIST) (e.g., National Windstorm Impact Reduction Program (NWIRP)), United States Geological Survey (USGS), industry, academy (e.g., National Science Foundation (NSF), Nearshore Extreme Events Reconnaissance (NEER), Structural Extreme Events Reconnaissance (StEER)), and the national media. Such onshore meteorological data can aid in calibrating SFMR measurements near shore, in using multi-Doppler synthesis to determine if mesoscale vortices and other features aloft enhance the surface wind field, in improving surface wind field analysis tools, in developing a rapid response hurricane landfall model based on Weather Research and Forecasting models, in developing GPU based numerical weather prediction tools, etc.

Consider that via a live feed transmitted from a video camera at exemplary monitoring station(s) 100, the pressure/velocity profiles can be continuously measured through passage to determine arrival times for tropical storm and hurricane force winds and storm surge, storm position, etc., such that intensity of the storm can be monitored until conditions subside and it is safe for first responders to return the affected area.

A weather monitoring and reporting system that incorporates monitoring stations 100 of the present disclosure can eliminate latency in reporting weather conditions and provide an unambiguous and data-driven platform to discuss evolving state of the weather. The arrival of tropical storm and hurricane force winds as well as storm surge can be instantly relayed, and events such as the passage of a rainband or eyewall can be described in "play by play" detail. In the same way that Hawk-Eye and Next Gen Stats have fundamentally enhanced the viewing experience of baseball and football fans, a live "full-field coverage" of a hurricane event can be implemented as the storm approaches, impacts, and departs the landfall region. The stations can continuously transmit live, high fidelity data and video feeds along the shoreline where the hurricane core transitions from ocean to land, providing the first indicator of deteriorating weather conditions as the storm makes landfall. The live video feeds streaming from each station can carry digital overlays providing key measures of intensity such as wind velocity, pressure, water depth to give audiences an unprecedented view of the hurricane's fury. Such data can also inform predictive analytics that describe the future state of inland weather.

Current news outlets utilize amateur storm chasers who often have no credible training to relay a rich, factual narrative related to storm intensity or infrastructure damage as they evolve. Deployment of exemplary monitoring stations 100 of the present disclosure can be used to supplement and improve storm-related news and data with the guidance of experts who are operating the monitoring stations during the occurrence of a storm.

Further, regarding reconnaissance aircrafts, it is noted that the primary instrument to measure surface wind velocity on a reconnaissance aircraft is the Stepped Frequency Microwave Radiometer (SFMR) which estimates gusts in 30 second intervals (4 km). However, while SFMR would be ideal for measuring surface velocity in the littoral zone, shoaling waves and land cause the instrument to lose accuracy. Also, emissivity is sea state dependent, and the rule of thumb for data collection is a minimum water depth of 30 meters. Advantageously, measured wind velocity, water depth, wave period/height, temperature, and salinity via an exemplary monitoring station of the present disclosure can produce the necessary calibration to operate the instrument of the reconnaissance aircraft closer to shore. Thus, meteorological data from the exemplary monitoring station 100 can also aid in improving aircraft-based tropical cyclone surface wind analysis and related tools.

Next, concerning landfall modeling, data generated by the monitoring stations will be ingestible by assimilation tools in numerical weather prediction tools to improve the accuracy of fore- and hind-casts. GPU based numerical weather prediction tools (e.g. machine learning models) also play a role in assimilation of meteorological observations, such as surface wind observations at coastal/inshore locations in addition to satellite and aircraft-based observations, to develop new weather forecasting models and landfall modeling. For example, machine learning, via a remote computing system 300, may be used to extract key information about the wave field induced by a hurricane.

Accordingly, a system for large-scale processing of weather-related data in accordance with various embodiments of the present disclosure can include a plurality of interconnected processors, such as those integrated in weather monitoring stations and remote computing systems, for coordinating a data processing job for processing a set of input weather-related data, such as sensor data from the weather monitoring stations, air-craft reconnaissance data, satellite reconnaissance data, at least one weather model, etc. In response to a request to perform the data processing job, the input data are assimilated and output data are generated, such as an improved weather model. In various embodiments, an exemplary system may be configured to identify and predict patterns or features of extreme hydrodynamic events based on an assimilation of meteorological observations, such as surface wind observations at coastal/inshore locations in addition to satellite and aircraft-based observations and provide reports, including video feeds, for end-users.

While global and regional dynamical models are the primary tools for predicting the impacts of hurricanes, they are not used to predict the wind fields over land for two good reasons. First, typical forecast track and intensity errors can cause huge errors in local wind forecasts; and secondly, forecast model over-land winds have not been validated or improved. However, recent work has shown that mesoscale weather models can reproduce the observed surface wind fields in landfalling hurricanes. Accordingly, sensor data obtained from exemplary weather monitoring stations and other available data, such as satellite-, aircraft-, and ground-based sensor data, video feeds, weather model(s), etc. can be assimilated as input data and analyzed to generate output data, such as an improved weather model. To illustrate, surface wind observations at coastal points of the exemplary weather monitoring stations can be used to correct or adapt weather prediction models as a storm approaches and continues inland. Both global and regional weather models can have large errors in vortex position, intensity, and size. Correspondingly, data assimilation is a mathematical procedure for adjusting the forecast toward observations as they become available, not just at the observing points, but also at surrounding points. For example, an Ensemble Kalman Filter is a type of data assimilation technique that uses an ensemble of simulations to know how to propagate the information from localized observations to the entire circulation. Surface wind observations at coastal points can then correct the size and intensity of the vortex as it approaches and continues inland. As a bonus, the resulting ensemble of forecasts gives us a more meaningful "most likely" outcome and variance.

In this regard, the sensor data from the exemplary weather monitoring stations can be input into a machine learning weather prediction model, which applies learned weights and relationships to the inputs in order to predict or forecast a weather event within a certain time period and/or geographic region. In this regard, the weather prediction model can use information from weather models, satellite image data, sensor data from the weather monitoring stations, sensor data for reconnaissance aircrafts, or other available data to define a relationship between this input data and output data that indicates a probability that a weather event will occur in a given geographic region during a given time period. In certain embodiments, the weather prediction model analyzes two sets of input data: training data and truth data, in which the truth data indicates the prediction results (e.g., wind velocities in the landfall region) that are desired for the input variables from the training data. As an example, the training data may encompass data for meteorological conditions (e.g., satellite-, aircraft-, and ground-based sensor data or images) measured for a geographic region at a time just prior to and leading up to an occurrence of a forecasted hurricane weather event at landfall and the truth data may define data indicative of the hurricane weather event that is actually measured at landfall, such as the sensor data obtained at the exemplary weather monitoring stations that are positioned in an array along a coastline as the hurricane reaches landfall. During training, the weather prediction model may determine a suitable weight or scaling factor to be used for scaling the input variable such that, when the input variables for a given weather event are scaled and summed (or otherwise combined) according to the weather prediction model, the result accurately corresponds to the desired output for that weather event.

Figure 5:
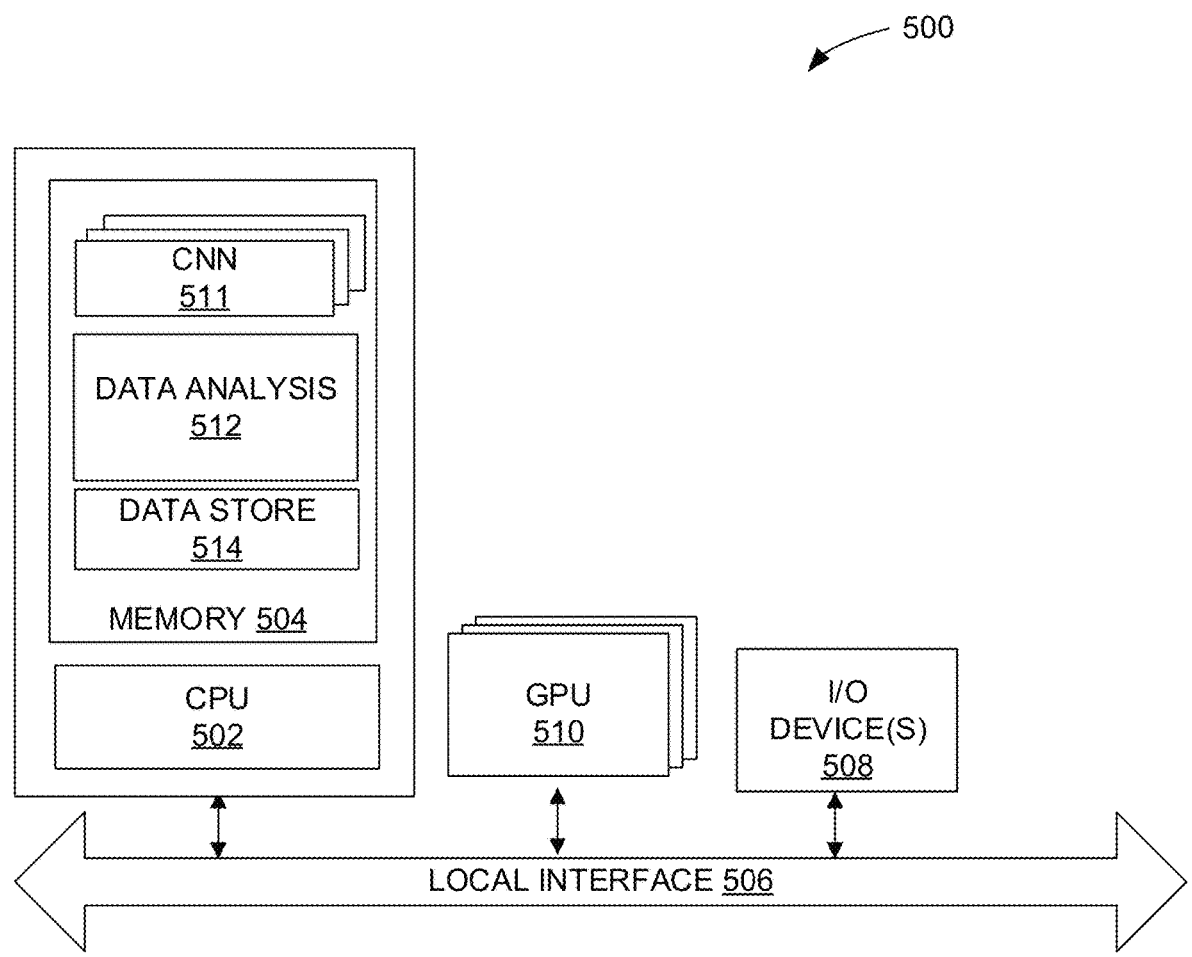
FIG. 5 depicts a schematic block diagram of a computing device that can be used to implement various embodiments of the present disclosure.

FIG. 5 depicts a schematic block diagram of a computing device 500 that can be used to implement various embodiments of the present disclosure, such as, but not limited to, one of the computing devices within an exemplary system for large-scale processing of weather-related data. An exemplary computing device 500 includes at least one processor circuit, for example, having a processor 502 and a memory 504, both of which are coupled to a local interface 506, and one or more input and output (I/O) devices 508. The local interface 506 may comprise, for example, a data bus with an accompanying address/control bus or other bus structure as can be appreciated. The computing device 500 further includes Graphical Processing Unit(s) (GPU) 510 that are coupled to the local interface 506 and may utilize memory 504 and/or may have its own dedicated memory. The CPU and/or GPU(s) can perform various operations such as image enhancement, graphics rendering, image/video processing, recognition (e.g., text recognition, object recognition, feature recognition, etc.), image stabilization, machine learning, filtering, image classification, and any of the various operations described herein.

Stored in the memory 504 are both data and several components that are executable by the processor 502. In particular, stored in the memory 504 and executable by the processor 502 are code for implementing one or more convolutional neural network (CNN) model(s) 511 (e.g., a weather prediction model(s)) and/or data analysis code 512 for analyzing sensor data from the weather monitoring stations, air-craft reconnaissance data, satellite reconnaissance data, and/or at least one weather model; identify and predict patterns or features of extreme hydrodynamic events based on an assimilation of meteorological observations, such as surface wind observations at coastal/inshore locations in addition to satellite and aircraft-based observations; and/or provide reports, including video feeds, for end-users. Also stored in the memory 504 may be a data store 514 and other data. The data store 514 can include an image database for video feed recordings, sensor data, and other data. In addition, an operating system may be stored in the memory 504 and executable by the processor 502. The I/O devices 508 may include input devices, for example but not limited to, a keyboard, touchscreen, mouse, one or more cameras and/or sensors, etc. Furthermore, the I/O devices 508 may also include output devices, for example but not limited to, speaker, earbuds, audio output port, a printer, display, Bluetooth output module, etc.

Certain embodiments of the present disclosure can be implemented in hardware, software, firmware, or a combination thereof. If implemented in software, the data analysis logic or functionality are implemented in software or firmware that is stored in a memory and that is executed by a suitable instruction execution system. If implemented in hardware, the data analysis logic or functionality can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In brief, the atmospheric science and wind engineering communities have been unable to reconcile the intensity and structure of surface winds in the littoral zone for over three decades. Combined wind/water measurements are urgently needed to advance the science and operation of numerical weather prediction tools, improve remote sensing estimation, and ultimately improve the understanding of how environmental loads damage the built and natural environment. In accordance with various embodiments of the present disclosure, an exemplary network of monitoring stations can provide an unprecedented view of hurricane wind and storm surge where the hurricane core crosses the coast. The resulting data can accelerate research directed at the prediction and characterization of wind and storm surge intensity and eliminate long standing blind spots for operational users, acting as a force multiplier for communicating about hurricane impacts to decisionmakers and the public.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

Therefore, at least the following is claimed:

1. A weather monitoring system comprising:
    at least one weather monitoring station, wherein the weather monitoring station comprises:
        an upper mast section having at least one elongated post equipped with an instrumentation package, wherein the instrumentation package at the upper mast section includes an orientation sensor to detect an orientation of the upper mast section relative to the earth surface's coordinate system, communications circuitry that is configured to establish a communications network with a network base station, at least a wind velocity sensor, and a control unit that is configured to at least receive sensor data and transmit communication data via the communications circuitry;
        at least one lower mast section including at least one elongated post equipped with a lower instrumentation package that is coupled to the upper mast section, wherein the lower instrumentation package includes at least a water depth sensor and a wave direction sensor; and
        a helical anchoring system that is coupled to the lower mast section, wherein the helical anchoring system includes at least one subsurface helical anchor for inserting into a ground surface within a littoral zone of a coastal area.

2. The weather monitoring system of claim 1, wherein the at least one lower mast section is coupled to the upper mast section at a junction of a rotational shock absorber that allows the upper mast section to deflect in response to wind or water forces.

3. The system of claim 1, wherein the upper mast section is approximately 10 meters tall.

4. The system of claim 1, wherein the orientation sensor is configured to measure an amount of deflection of the upper mast section and the control unit is configured to reorient a reference frame of the upper mast to the earth surface's coordinate system.

5. The system of claim 1, wherein the instrumentation package at the upper mast section is positioned at a height of 10 meters above the ground surface, wherein the control unit is configured to estimate an equivalent wind velocity at the height of 10 meters by applying a wind velocity conversion to wind velocity measurements obtained by the wind velocity sensor that accounts for a change in height of the upper mast section caused by a deflection of the upper mast section.

6. The system of claim 1, wherein the instrumentation package at the upper mast section further includes a sensor configured to measure wind direction.

7. The system of claim 1, wherein the instrumentation package at the upper mast section further includes a video camera that is configured to record a video feed that is communicated to the network base station.

8. The system of claim 7, wherein the video feed is augmented with sensor information obtained from at least the instrumentation package of the upper mast section.

9. The system of claim 8, wherein the sensor information comprises at least wind velocity and wind pressure data.

10. The system of claim 1, wherein a structure of the upper mast section is composed of three rods in a triangular orientation, the system further comprising truss chords at diagonal placement between pairs of the three rods.

11. The system of claim 1, wherein the at least one subsurface helical anchor comprises four helical anchoring piles that are configured to be assembled during installation, wherein an assembled anchoring system is capable of transferring internal axial, shear, bending moment, and torsion forces across connections of the assembled anchoring system.

12. The system of claim 1, wherein the instrumentation package at the upper mast section further includes a barometric pressure sensor, and an air temperature sensor.

13. The system of claim 1, wherein the lower instrumentation package at the at least one lower mast section includes a water temperature and a salinity sensor.

14. The system of claim 13, wherein the lower instrumentation package at the at least one lower mast section further includes an erosion sensor.

15. The system of claim 1, wherein the at least one weather monitoring station comprises an array of multiple weather monitoring stations, wherein the array of multiple weather monitoring stations is installed on an open shoreline in a pattern that is configured to observe a single extreme wind event.

16. The system of claim 15, wherein each of the multiple weather monitoring stations is configured to connect with the communication network.

17. The system of claim 16, wherein each of the multiple weather monitoring stations is further configured to provide public wireless access to the communication network.

18. The system of claim 1, wherein the control unit is configured to transmit the sensor data to a remote computing system over the communication network.

19. A method for monitoring an extreme wind event comprising:

mounting one or multiple weather monitoring stations in an array on an open shoreline within a littoral zone of a coastal area in a pattern that is configured to observe a single extreme wind event, wherein an individual weather monitoring station comprises:

an upper mast section having at least one elongated post equipped with an instrumentation package, wherein the instrumentation package at the upper mast section includes an orientation sensor to detect an orientation of the upper mast section relative to the earth surface's coordinate system, communications circuitry that is configured to establish a communications network with a network base station; at least a wind velocity sensor, and a control unit that is configured to at least receive sensor data and transmit communication data via the communications circuitry;

at least one lower mast section including at least one elongated post equipped with a lower instrumentation package that is coupled to the upper mast section, wherein the lower instrumentation package includes at least a water depth sensor and a wave direction sensor; and an anchoring system that is coupled to the lower mast section, wherein the anchoring system includes at least two helical or screw piles for inserting into a ground surface within a littoral zone of a coastal area;

measuring, by the control unit of the individual weather monitoring station, an amount of deflection of the upper mast section of the individual weather monitoring station and reorienting a reference frame of the upper mast to the earth surface's coordinate system; and estimating, by the control unit of the individual weather monitoring station, an equivalent wind velocity by applying a wind velocity conversion to wind velocity measurements obtained by the wind velocity sensor that accounts for a change in height of the upper mast section caused by a deflection of the upper mast section.

* * * * *